(12) United States Patent
Moffatt

(10) Patent No.: US 7,794,535 B2
(45) Date of Patent: *Sep. 14, 2010

(54) PIGMENTS STABILIZED TO ACID CHALLENGE

(75) Inventor: John R. Moffatt, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/218,841

(22) Filed: Jul. 17, 2008

(65) Prior Publication Data

US 2008/0308002 A1 Dec. 18, 2008

Related U.S. Application Data

(63) Continuation of application No. 10/848,440, filed on May 18, 2004, now Pat. No. 7,416,594.

(51) Int. Cl.
*C09D 11/02* (2006.01)
(52) U.S. Cl. .................................. 106/31.6
(58) Field of Classification Search ............... 106/31.6
See application file for complete search history.

(56) References Cited

U.S. PATENT DOCUMENTS

| | | | |
|---|---|---|---|
| 5,106,416 A | 4/1992 | Moffatt et al. | |
| 5,108,504 A | 4/1992 | Johnson et al. | |
| 5,116,409 A | 5/1992 | Moffatt | |
| 5,133,803 A | 7/1992 | Moffatt | |
| 5,226,957 A | 7/1993 | Wickramanayake et al. | |
| 5,698,016 A * | 12/1997 | Adams et al. | 106/31.6 |
| 5,749,952 A | 5/1998 | Tsang et al. | |
| 5,785,745 A | 7/1998 | Lauw et al. | |
| 5,935,309 A | 8/1999 | Moffatt et al. | |
| 5,985,016 A | 11/1999 | Tsang et al. | |
| 6,086,198 A | 7/2000 | Shields et al. | |
| 7,416,594 B2 * | 8/2008 | Moffatt | 106/31.6 |

* cited by examiner

*Primary Examiner*—Jerry Lorengo
*Assistant Examiner*—Veronica Faison Gee

(57) ABSTRACT

An electrostatically stabilized ink includes a dispersion which is electrostatically stabilized and comprises a pigment. The ink also includes an ionic amphiphile additive which has a charge center having an opposite charge from a charge center of the dispersion.

37 Claims, 5 Drawing Sheets

LAURYL TRIMETHYLAMMONIUM BROMIDE
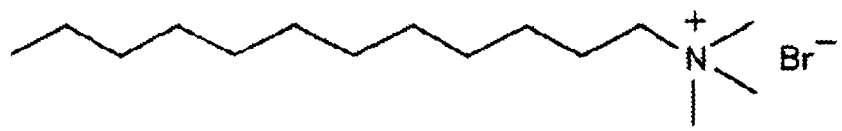
MYRISTYL TRIMETHYLAMMONIUM BROMIDE
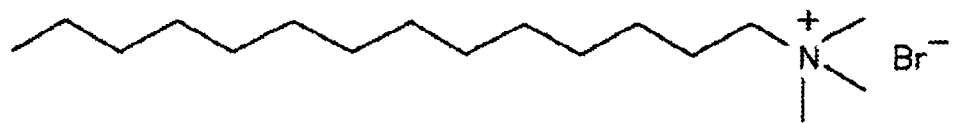
CETYL TRIMETHYLAMMONIUM MESYLATE (METHYLSULFONATE)
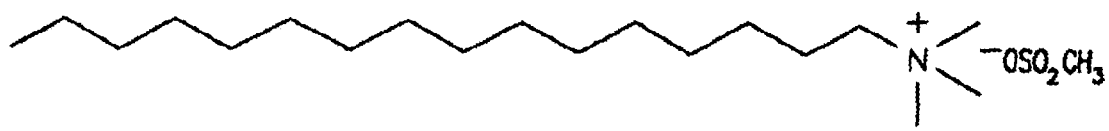
N-HEXADECYL-N-METHYLIMIDAZOLIUM BROMIDE
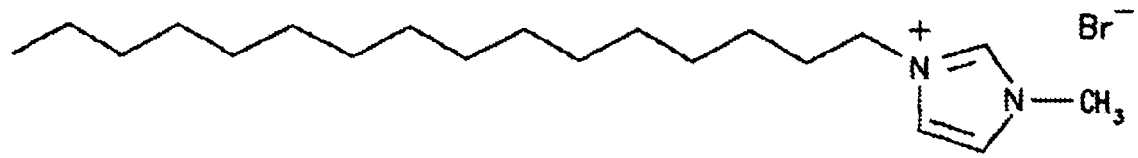
FIG. 6

US 7,794,535 B2

PIGMENTS STABILIZED TO ACID CHALLENGE

RELATED APPLICATIONS

This application is a continuation of U.S. patent application Ser. No. 10/848,440, filed on May 18, 2004, now U.S. Pat. No. 7,416,594 which is hereby incorporated by reference in its entirety.

BACKGROUND

Pigments used in printing inks tend to be attracted to one another in the ink. If enough pigment particles become associated, the particles tend to fall out of solution. To prevent this, dispersants are added to the ink containing the pigment particles.

Dispersants generally use one of two methods for preventing the pigment particles from agglomerating. One method uses bulky groups attached to the pigment particle to prevent (or at least hinder) the pigment particles from being able to interact in such a way that they can coagulate. This method may be referred to as the steric hindrance method.

Another method which may be used to prevent the pigment particles from coagulating is electrostatic stabilization. This method generally associates dispersants with the pigment particles, the dispersants having a charged group which has the same charge as the other dispersants. This causes the individual dispersion complexes (pigment+dispersant) to be repelled from each other. Thus, two pigment particles each having a negatively charged dispersant associated with it will be repelled from each other due to the fact that like charges are repelled from each other.

Dispersants tend to be selected such that they sufficiently interact with the pigment particle to form a stabilized dispersion complex. While uncommon, it is also possible for a pigment particle to have sufficient steric hindrance to be sterically stabilized or sufficient charge to be electrostatically stabilized without the use of a dispersant. As used herein, dispersion will refer to any particle or complex of particles that tend to disperse from each other. Reference to a dispersion complex is a reference to the combination of a pigment and a dispersant which are associated and which complex tends to be dispersed from other dispersions.

With electrostatically stabilized pigment dispersions, excursions in pH can lead to their instability. With present pigmented inks, pH decreases with accelerated storage testing time, which can amount to 0.5 pH units. The decrease in pH also heralds an increase in ionic strength, which has an adverse, shrinking effect on the Debye screening length as well as protonization of the carboxylate groups on the dispersant. Thus, a double-barreled threat presents itself to a pigment's stability with shifts in pH over time.

Buffers may be employed to stabilize the pH, but, in order to achieve the buffering capacity to withstand pH drift, a high concentration of buffer is used which contributes significantly to the total ionic strength of the solution and thus lowers the Debye screening length as well.

The teachings herein below extend to those embodiments which fall within the scope of the appended claims, regardless of whether they accomplish one or more of the above-mentioned needs, benefits, or preferences.

BRIEF DESCRIPTION OF THE DRAWINGS

FIG. 6 includes chemical structures for various cationic amphiphiles tested for protection against acid challenge according to various exemplary embodiments.

DETAILED DESCRIPTION

Figure 1:
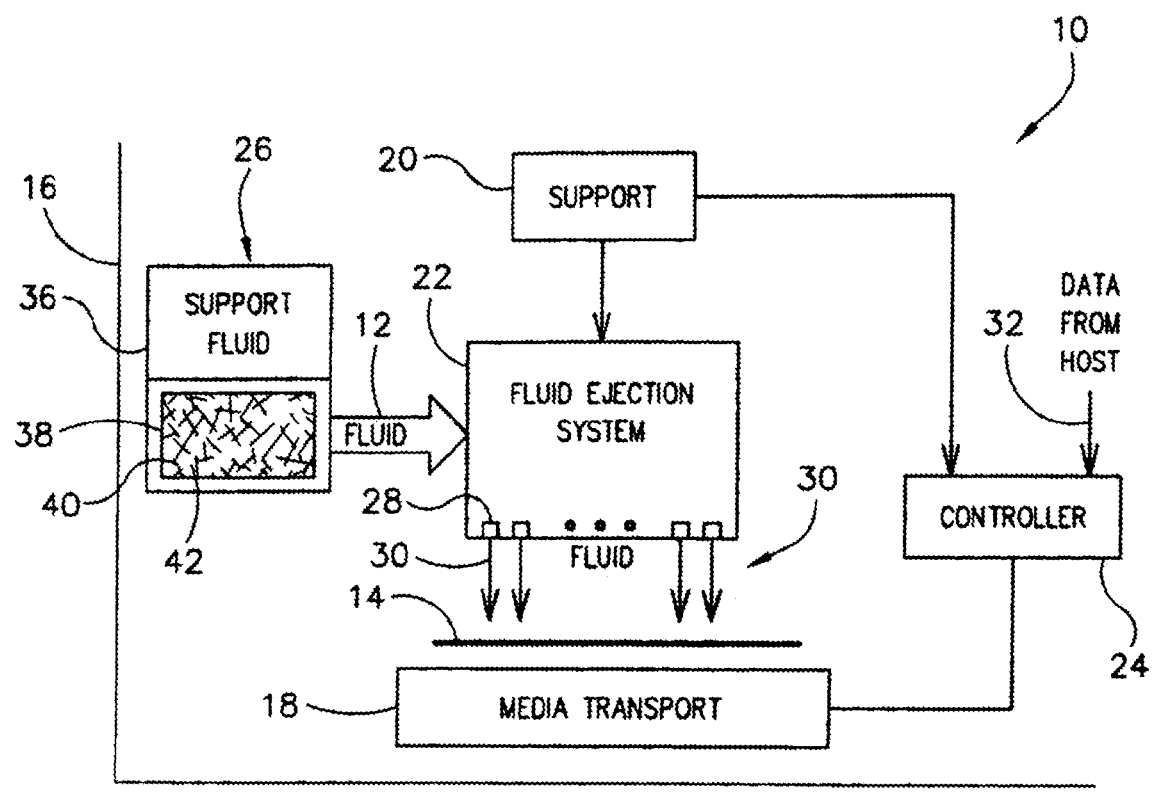
FIG. 1 is a schematic illustration of a fluid deposition system including a fluid supply media according to one exemplary embodiment.

In this application, the term solution is being used to refer, unless stated otherwise, to a solution having two or more types of particles where one particle is dissolved in, suspended in, or otherwise maintained with the other particle. Most applications of a solution according to the disclosed embodiments tend to be liquid solutions.

Dispersants may use negatively charged groups to repel dispersion complexes from each other and keep the pigments from coagulating. One example of such a negatively charge group is a carboxylate group. As the pH of the solution becomes more acidic, the carboxylate group tends to attract more free H+ ions from the solution which transforms the carboxylate group to a carboxylic acid group. These carboxylic acid groups are less dispersive than the carboxylate groups (they do not have a negative charge like the carboxylate group has), which means that the dispersant is less able to repel dispersion complexes from each other and less able to keep the pigments from coagulating and falling out of solution (referred to as a loss of turbidity).

It has been a general principle that ionic additives having a charge opposite that of the dispersion would tend to have a similar effect on the dispersion as having a solution with a more acidic pH. The disclosed embodiments show results that would not be expected given this current wisdom and which show that the prevailing wisdom is not entirely accurate.

Generally, an ionic additive particle having an opposite charge than the dispersion, but which has sufficient hydrophobicity to interact with the dispersion may avoid causing the dispersion to destabilize and thereby cause the pigment particles to coagulate and fall out of solution as would be predicted given the prevailing wisdom. Thus, for negatively charged dispersants, a positively charged ion having sufficient hydrophobicity to interact with the dispersion may avoid causing the dispersion to coagulate.

When used with negatively charged dispersion complexes, an additional benefit can be realized. As mentioned above, negatively charged dispersion complexes tend to suffer from a loss of ability to stay separated as the pH becomes more acidic (i.e. at lower pH levels). A cationic additive with sufficient hydrophobicity to interact with the dispersion may tend to increase the ability of the negatively charged dispersion to resist a loss of stability as the pH becomes more acidic (i.e. may help the dispersion resist acid challenged destabilization—referred to herein as protecting the dispersion from acid challenge).

It is generally advantageous to choose a charge center (the atom or portion(s) of the particle carrying the charge of the particle) for the additive that is most likely to interact with the charge center of the dispersion. As mentioned above, carboxylate groups are one common group used to electrostatically stabilize a dispersion. Carboxylate groups are generally considered to be soft charge centers having a negative charge (also referred to as a soft base). Thus, according to Pearson's hard and soft acid-base theory, the best counter ion to be included in the additive would have a soft charge center having a positive charge (also referred to as a soft acid). Some examples of soft acids include imidizolium ions, quaternary ammonium ions, phosphonium ions, and sulfonium ions. For a brief discussion of Pearson's hard and soft acid-base theory and a list of some hard and soft acids and bases, see Inorganic Chemistry: Principles of Structure and Reactivity, Fourth Edition at pages 345-354. Reference to a soft acid, soft base, hard acid, or hard base is also a reference to those acids/bases which are borderline between hard and soft. Reference to a truly soft acid, a truly soft base, a truly hard acid, or a truly hard base is a reference only to those acids/bases which are clearly soft/hard.

An additive may also be able to associate favorably with the dispersion itself. An additive may have sufficient hydrophobicity to associate favorably with the dispersion (generally with the pigment). For dispersions including large hydrophobic regions, this generally means that the additive is more attracted to the hydrophobic environment in a solution (generally characterized by the dispersion) than it is to the hydrophilic environment of the solution (generally characterized by the bulk solvent). The additive may even be significantly more attracted to the hydrophobic environment in a solution than it is to the hydrophilic environment of the solution (e.g. having a concentration in the hydrophobic region that is at least about 10 times that in the hydrophilic region). In other embodiments, the additive may have a concentration in the hydrophilic region that is no more than about 100 times that present in the hydrophobic region. For a discussion of hydrophobic interactions in colloids and surfactants, see Physical Chemistry of Surfaces, Fifth Edition, by A. W. Adamson.

Ionic amphiphiles may posses both an appropriate charge center and sufficient hydrophobicity to interact with the dispersion. Ionic amphiphiles having a soft charge center (generally a positive charge center—a cation) with a longest carbon side chain, extending from the charge center, with a length of about 9 to about 20 carbon atoms (C9 to C20) is one example of a group of ionic amphiphiles which may posses sufficient hydrophobicity to interact with the dispersion. In another embodiment, the longest side chain has a length of at least about 10 and no more than about 16 carbon atoms. In some embodiments, the side chain may include a total of about 9 to 20 carbon atoms. Further, the side chain may consist essentially of carbon atoms. The organic side chain may be a straight chain or may be branched. The organic side chain may be an alkane, an alkene, and/or include some other group. In some embodiments, the charge center does not have more than one organic side chain comprising more than five (or potentially no more than one to three) carbon atoms.

According to some embodiments an additive may be added in limited quantities and still provide a beneficial contribution to the properties of the ink. According to one embodiment, the additive may be present in the ink in an amount no more than 1 or even 0.5 M (moles/Liter). Further, the additive may be present in the ink in an amount no more than about $10^{-2}$ or $10^{-3}$ M. According to some embodiments an additive may be present in the ink in concentrations of at least $10^{-5}$ M, or the additive may be present in the ink in an amount that is no less than about $10^{-4}$ M.

It is a general principle that even stabilized dispersions will inevitably coagulate and fall out of solution. The typical length of time that a given formulation can maintain the bulk of the dispersion in the ink is referred to as the shelf life of the ink. The additive may be able to protect the dispersions from acid challenge to impart a sufficient shelf life to the ink. Sufficient shelf life is generally determined based on an acceptable amount of time it takes from the manufacture of the ink to the sale and use of the ink. In one embodiment, a sufficient shelf life is generally considered to be on the order of at least about two years.

In some embodiments, the additive may be a surfactant or act like a surfactant. Surfactants can impart desirable properties to an ink. One such desirable property may include reducing the amount of bleeding—such as color to color bleeding and/or black to color bleeding. Bleeding occurs when one pigment extends (bleeds) into an area intended to solely contain a pigment of a different color. For example, a yellow colored pigment might bleed into an area intended to only include a blue colored pigment. This would cause the area to appear green instead of blue. It is generally desirable to reduce the amount of bleeding that occurs in the inks so that the resolution of any resulting image can be increased (i.e. pixels of pigments of different colors can be spaced closer together).

Additives are generally added to the ink to enhance additional performance parameters. As one example, an additive may be added to reduce the tendency of the pigment to bleed. For electrostatically stabilized dispersions, a single additive may be used which can both protect the dispersion from acid challenge and can reduce the amount of bleeding a pigment exhibits. Such an additive may reduce the amount of other additives (generally surfactants) that would be needed to reduce the tendency of the pigment to bleed. In one embodiment, the only surfactants present in the ink that have a notable effect on the tendency of the pigment to bleed consist essentially of additives that also protect the dispersion from acid challenge. In a more limited embodiment, essentially all (e.g. at least 98%) of the surfactants in the ink that have a significant effect on the tendency of the pigment to bleed also protect the dispersion from acid challenge.

As discussed above, dispersions may become less effective at keeping the pigments in solution as the pH becomes more acidic. To be most effective, the ink is initially placed at as high a pH as possible (i.e. as non-acidic as possible). Some inks are intended to be used with printers that incorporate a silica-based firing chamber/nozzle to dispense the ink on a printable medium. If the pH of the ink is too high, the ink will tend to attack the silica-based firing chamber/nozzle. An ink intended for use in such a printing application generally has a pH of no more than about 9 and typically no more than about 8.5.

Buffers are generally used at some preset pH, but become less effective if the pH is allowed to stray from the preset pH. While most embodiments will need to balance the considerations listed above to determine the starting pH of the solution, it would be desirable to use an additive that is capable of defending against acid challenge as the pH lowers from the starting pH. Some embodiments of an additive that protects against acid challenge may be configured to protect against acid challenge at low pH levels. The ability to protect against acid challenge may be measured based on the loss of turbidity (the number of particles suspended in a volume of solution) of the ink over time at a particular pH. For instance, in some embodiments, the additive may be able to protect an ink from a substantial loss of turbidity (e.g. no more than 15% loss) at a pH of 2.23 for a period of at least one hour. In other embodiments, the additive may be able to protect an ink from essentially all loss of turbidity (e.g. no more than about 3%) at a pH of about 3.0 for a period of at least about 16 hours. Further, the additive may exhibit an ability to protect against all loss of turbidity under those conditions during those periods. The additive may be able to achieve any of the results discussed above at a concentration of no more than about $10^{-2}$ M and potentially at a concentration of no more than about $10^{-3}$ M. This may be referred to as the ability of the additive to resist an acid challenge of a particular pH with a particular concentration for a particular period of time. For instance, one embodiment may be able to protect against substantial acid challenge (e.g. no more than a 15% loss of turbidity) of a pH of 3.0 at a concentration of no more than about $10^{-2}$ M (i.e. of the additive) for at least about one hour. Another embodiment may be directed to additives that can protect against substantial acid challenge at a pH of 6.0 at a concentration of no more than 0.5 M for at least twelve weeks. Turbidity may be quantified by measuring (and alternatively referred to as) the light absorbance of a sample, which absorbance may be measured using a UV-V is spectrophotometer.

When a pigment particle of the ink is not self stabilizing, a common dispersant used to electrostatically stabilize the pigment particle may include a polymer. One type of polymer that may be used is a polyacrylic acid or a copolymer of acrylic acid. Reference to a polymer of acrylic acid could refer to either polyacrylic acid or a copolymer of acrylic acid.

The ink may further include biocides to inhibit growth of microorganisms. Exemplary biocides include Ucarcide™, Proxel™, and NuoCept™. Also, sequestering agents such as EDTA may be included to eliminate deleterious effects of heavy metal impurities. Additionally, buffer solutions may be used to control the pH of the ink, although, according to one embodiment, the ink is substantially free of buffer solutions. Other known additives such as viscosity modifiers and other acrylic or non-acrylic polymers may be added to improve various properties of the ink as desired.

A formulation for an ink according to one embodiment includes a dispersion (about 0.5% to 10 wt %), one or more cosolvents (0.01 to about 50 wt % or about 0.1 to about 15 wt %), one or more surfactants/amphiphiles (0 to about 40 wt % or about 0.1 to about 10 wt %), one or more high molecular weight colloids (0 to about 3 wt %), one or more buffers (0.00 to about 0.05 wt %). and water (balance). Suitable cosolvents, surfactants, and high molecular weight colloids can be seen in U.S. Pat. Nos. 6,221,932 and 5,133,803, the entire disclosures of which are hereby incorporated by reference to the extent they are consistent with the present disclosure.

The additives and dispersions described above may be included in an ink to be used in conjunction with a fluid deposition system that deposits the ink on a medium to form an image.

FIG. 1 schematically illustrates fluid deposition system 10 configured to deposit a fluid 12 upon a medium 14. Fluid 12 comprises a liquid material such as ink which creates an image upon medium 14. In other applications, fluid 12 may include or carry non-imaging materials, wherein system 10 is utilized to precisely and accurately distribute, proportion and locate materials along medium 14.

Medium 14 comprises a structure upon which fluid 12 is to be deposited. In one embodiment, medium 14 comprises a sheet or roll of a cellulose based or polymeric based material. In other applications, medium 14 may comprise other structures which are more three dimensional in shape. Other mediums may include textiles, wood, and plastic.

Fluid deposition system 10 generally includes housing 16, media transport 18, support 20, fluid ejection system 22, control circuit 24 and fluid supply 26. Control circuit 24 may include various types of processing circuitry, digital and/or analog, and may include a microprocessor, microcontroller, application-specific integrated circuit (ASIC), or other circuitry configured to perform various input/output, control, analysis, and other functions. Media transport 18 comprises a device configured to move medium 14 relative to fluid ejection system 22. Support 20 comprises one or more structures configured to support and position fluid ejection system 22 relative to media transport 18. In one embodiment, support 20 is configured to statically support fluid ejection system 22 as media transport 18 moves medium 14. In such an embodiment, commonly referred to as a page-wide-array printer, fluid ejection system 22 may substantially span a dimension of medium 14.

In another embodiment, support 22 is configured to move fluid ejection system 22 relative to medium 14. For example, support 20 may include a carriage coupled to fluid ejection system 22 and configured to move system 22 along a scan axis across medium 14 as medium 14 is being moved by media transport 18. In particular applications, media transport 18 may be omitted wherein support 20 and fluid ejection system 22 are configured to deposit fluid upon a majority of the surface of medium 14 without requiring movement of medium 14.

Fluid ejection system 22 generally comprises a mechanism configured to eject fluid 12 onto medium 14. In one embodiment, fluid ejection system 22 comprises a print head having a plurality of injection openings or ink jet nozzles 28 configured to dispense fluid 12 in the form of drops 30. In other embodiments, fluid ejection system 22 may include other devices configured to selectively eject fluid 12 upon medium 14.

Control circuit 24 generally comprises a processor configured to generate control signals which direct the operation of media transport 18, support 20 and fluid ejection system 22. For purposes of disclosure, the term "processor unit" shall mean a conventionally known or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. Control circuit 24 is not limited to any specific combination of hardware circuitry and software, nor to any particular source for the instructions executed by the processing unit.

As indicated by arrow 32, control circuit 24 receives data signals from one or more sources representing the image or deposition pattern of fluid 12 to be formed on medium 14. The source of such data may comprise a host system such as a computer or a portable memory reading device associated with system 10. Such data signals may be transmitted to control circuit 24 along infrared, optical, electric or by other communication modes. Based upon such data signals, control circuit 24 generates control signals that direct the movement of medium 14 by transport 18, that direct the positioning of fluid ejection system 22 by support 20 (in those embodiments in which support moves ejection system 22) and that direct the timing at which drops 30 of ink 12 are ejected by nozzles 28 of ejection system 22.

Fluid supply 26 supplies fluid 12 to fluid ejection system 22. Fluid supply 26 includes fluid source 36, and reservoir 38. Fluid source 36 serves as a source of fluid 12 to reservoir 38. In one particular embodiment, fluid source 36 comprises a receptacle or chamber containing fluid 12 that is configured to be releasably or removably coupled to reservoir 38 such that fluid flows into reservoir 38 from fluid source 36. For example, fluid source 36 may include a needle which pierces a septum provided on reservoir 38, wherein fluid 12 from source 36 flows into reservoir 38 through the needle. In another embodiment, fluid source 36 comprises a distinct chamber containing fluid 12 that is permanently fixed to reservoir 38 and is configured to supply fluid 12 to reservoir 38 upon actuation of a valving mechanism associated with source 36 or reservoir 38. An example of such an arrangement is found in U.S. Pat. No. 6,679,594 by Robert Sesek and Travis J. Parry entitled Imaging Media Cartridge Having a Reserve Chamber, the entire disclosures of which are hereby incorporated by reference to the extent they are consistent with the present disclosure.

In yet another embodiment, fluid source 36 comprises a distinct source of fluid configured to deliver fluid to reservoir 38 through one or more conduits, such as tubes using gravitational force, one or more pumping devices or other flow actuating mechanisms. In such an application, fluid source 36 may provide either a one-way fluid delivery system in which fluid flows from source 36 to reservoir 38 or a recirculating fluid delivery system in which fluid flows from source 36 to reservoir 38 and to fluid ejection system 22 and also flows from fluid ejection system 22 to fluid source 36. In other particular applications, fluid may alternatively return from fluid ejection system 22 directly to reservoir 38. In still other embodiments, fluid source 36 is omitted, wherein the entire supply of fluid for fluid ejection system 22 is provided from reservoir 38.

Figure 2:
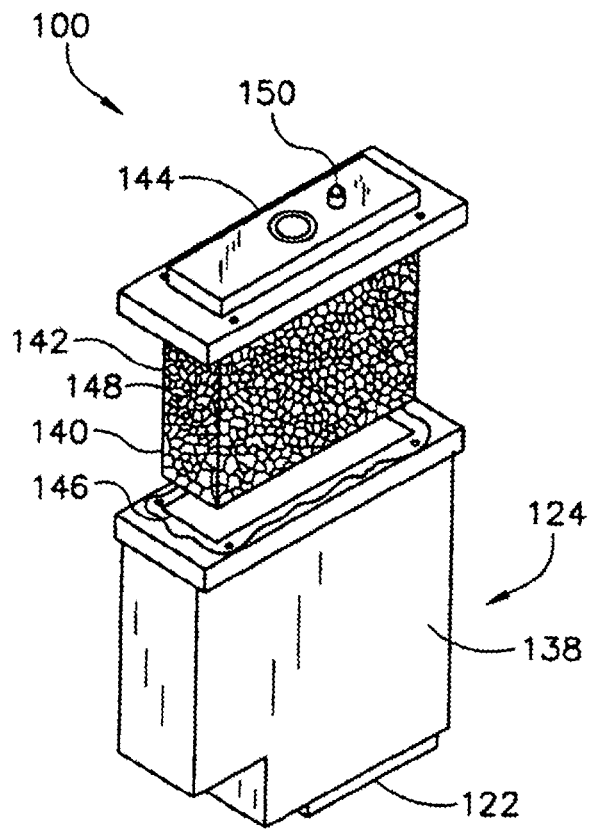
FIG. 2 is a top perspective view of a print cartridge including the fluid supply media according to one exemplary embodiment.

FIG. 2 illustrates ink jet print cartridge 100 which is configured to be used by a fluid deposition system such as system 10 described with respect to FIG. 1. Print cartridge 100 includes fluid ejection system 122 and fluid supply 124. Fluid ejection system 122 comprises a print head having a plurality of nozzles (not shown) configured to eject ink or other fluid. Fluid ejection system 122 is coupled to fluid supply 124.

Fluid supply 124 supplies fluid, such as ink, to fluid ejection system 122 and includes reservoir 138. Reservoir 138 generally comprises a body having an interior 146 configured to contain a fluid to be dispensed by ejection system 122 and porous mass 140 with antifoaming agents 142. In the particular embodiment shown, reservoir 138 is configured to be removably coupled to a carriage and to be conveyed by the carriage along a scan axis across a print medium.

Fill port 150 generally comprises an inlet through closure 144, enabling cartridge 100 to be refilled with fluid. In the particular embodiment illustrated, fill port 150 includes a mechanism configured to seal the opening provided by fill port 150 once filling of cartridge 100 is completed or is caused. In one application, the sealing mechanism may automatically seal any formed opening such as a valving mechanism or a septum. In another application, fill port 150 may be configured to be manually closed when not in use.

The following examples are presented to illustrate the present embodiments and to assist one of ordinary skill in making and using the same. The examples are not intended in any way to limit the scope of the claims.

Example 1

A first additive includes Cetyl Trimethylammonium Mesylate (CTAOMes) (N,N,N-trimethyl-N-hexadecylammonium methanesulfonate). The CTAOMes additive was formed by refluxing hexadecyidimethylamine and methyl methanesulfonate (1:1 mole ratio) in acetonitrile overnight. After cooling to room temperature the crude CTAOMes crystals separated from the reaction mixture. The CTAOMes crystals were then purified by 3× recrystallization from ethyl acetate and the crystals were allowed to dry overnight on a Buchner funnel before characterization.

CTAOMes includes a longest carbon side chain length of C16 extending off of the charge center and includes three additional side chains having a methyl group. CTAOMes has a soft charge center, the center being a quaternary ammonium group.

Example 2

A magenta pigment from DIC (HPB3001, lot #T020522) and a Cabot Cyan self-dispersed pigment (IJX-356, cyan) were investigated for the rate of coagulation caused by acid challenge. The loss of pigment turbidity, $\tau$, at $\lambda$=276 nm was followed using a Cary 5000NIR spectrophotometer equipped with a Peltier temperature control circuit and stirrer. The stirring rate was kept at 800 rpm and the temperature at 35° C. throughout the investigation. To initiate coagulation a 200 µL aliquot of 0.1M HCl was added to the cuvette, containing 3 mL of either the DIC or Cabot pigment dispersion at a concentration of ca. $10^{13}$ particles $L^{-1}$. For those runs containing both additive and HCl a 200 µL aliquot of the additive was added to the cuvette containing the pigment and allowed temperature equilibration for a few minutes prior to the addition of the HCl. No loss of $\tau$ prior to addition of HCl was observed in the presence of additive.

Runs were also conducted using the non-ionic amphiphile Tergitol-15-S-7 (T15S7). In the presence of T15S7, complete loss of turbidity occurred in less than twenty minutes. T15S7 slowed the coagulation of the pigment, but did not stabilize the pigment dispersions.

Figure 3:
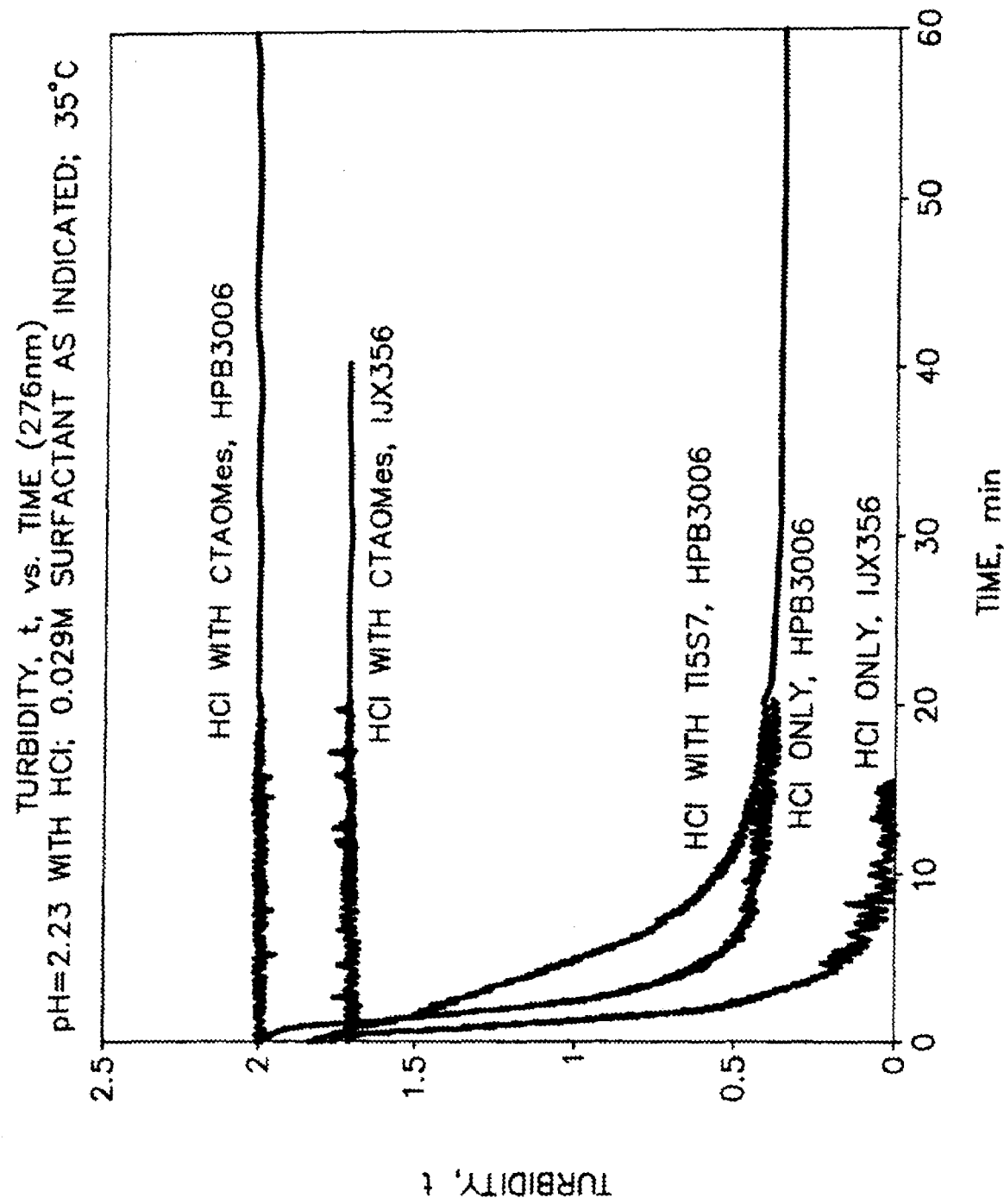
FIG. 3 is a graph showing test results of the protection against acid challenge provided by CTAOMes in an exemplary embodiment.

FIG. 3 shows the results of acid challenge in the presence and absence of CTAOMes. With CTAOMes present at 0.029M there was no decrease in $\tau$ for over 60 minutes for the DIC and Cabot pigment dispersions with HCl at pH=2.23. In the absence of CTAOMes complete loss of $\tau$ occurred in less than 20 minutes. Also, upon standing in the cuvette, no loss of $\tau$ was observed for several days. The coagulated pigment in the absence of CTAOMes was found clinging to the stirring bar, the sides of the cuvette and mostly in the solution as strands at the end of the runs.

Example 3

Figure 4:
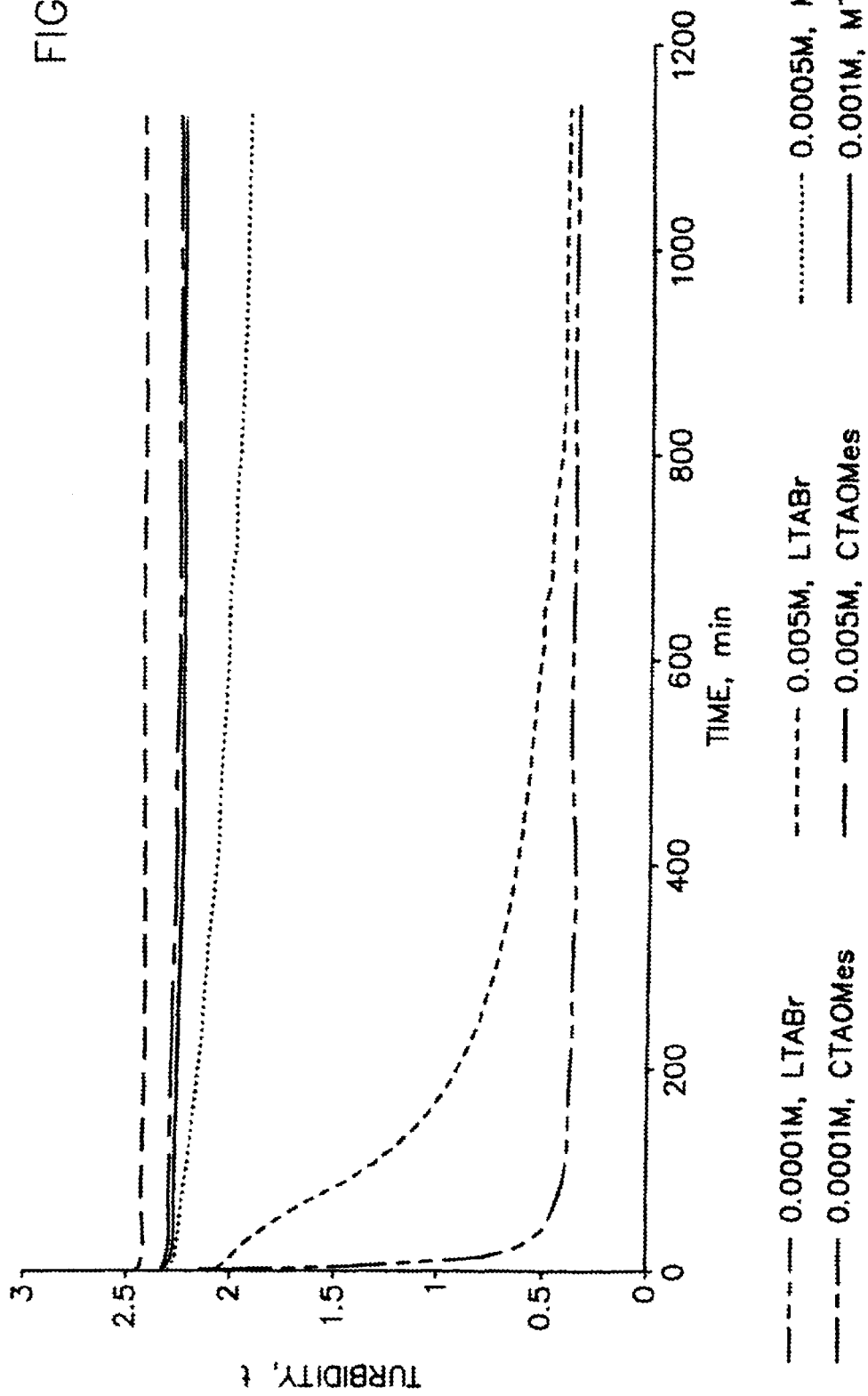
FIG. 4 is a graph showing test results of the protection against acid challenge provided by additional cationic amphiphiles according to some exemplary embodiments.

Similar turbidity tests were run using additional cationic amphiphiles including Lauryl Trimethylammonium Bromide (LTABr), Myristal Trimethylammonium Bromide (MTABr), and CTAOMes. As shown in FIG. 4, LTABr, MTABr and CTAOMes all show inhibition of turbidity loss at concentrations 0.001M MTABr; 0.005M LTABr and 0.0001M CTAOMes, respectively.

LTABr includes a longest carbon side chain length of C12 extending off of the charge center and includes three additional side chains composed of methyl groups (C1) extending from the charge center. LTABr has a soft acid charge center, the center being a quaternary ammonium group.

MTABr includes a longest carbon side chain length of C14 extending off of the charge center and includes three additional side chains composed of methyl groups extending from the charge center. MTABr has a soft acid charge center, the center being a quaternary ammonium group.

Example 4

Figure 5:
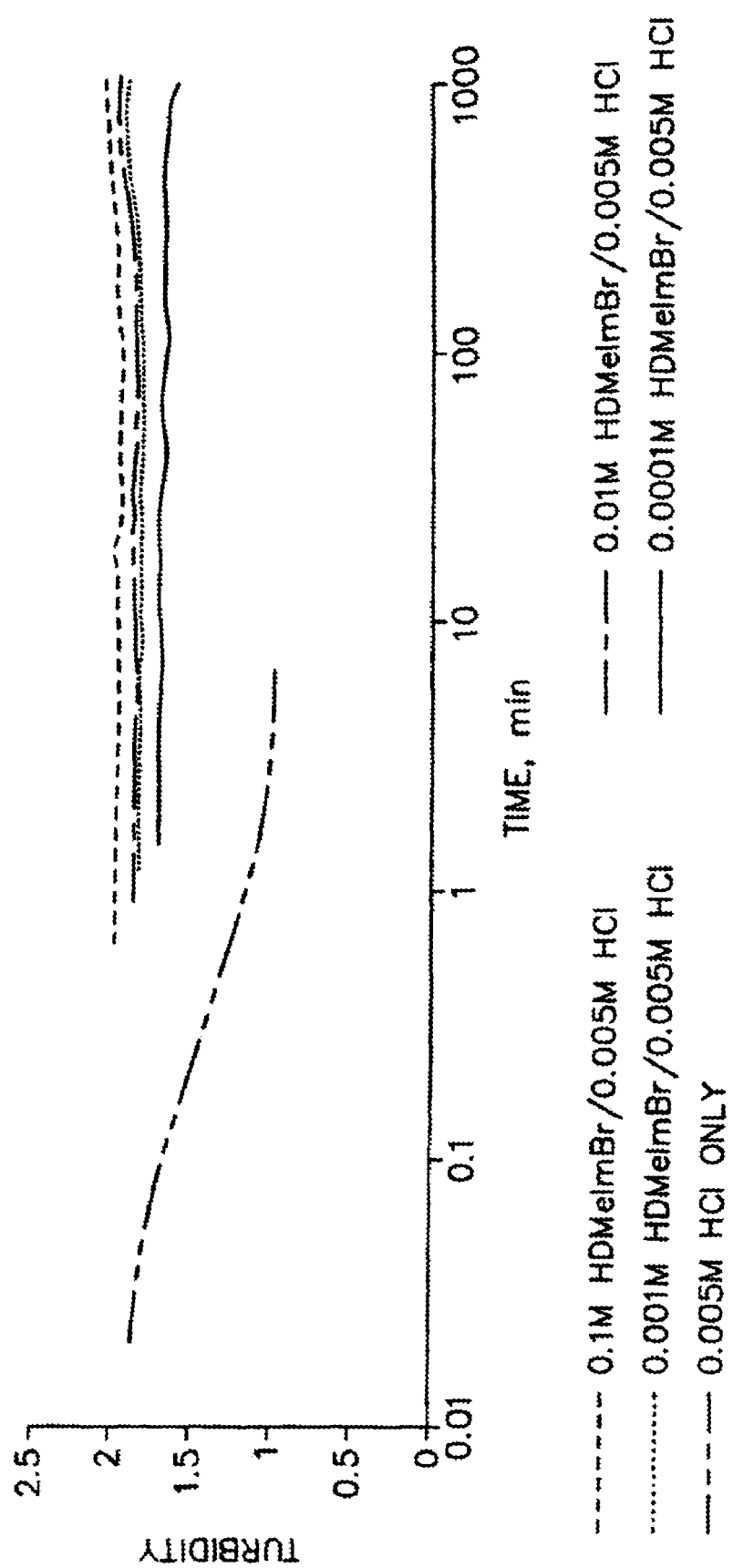
FIG. 5 is a graph showing test results of the protection against acid challenge provided by HDMeImBr at various concentrations of HDMeImBr according to an exemplary embodiment.

Similar turbidity tests were run using N-hexadecyl-N-methylimidiazo-lium bromide (HDMeImBr) at differing concentrations. As shown in FIG. 5, the control with HCl acid only, showed a Turbidity that decreased and reach a plateau in about 6-8 minutes. The color curves indicate that the addition of HDMeImBr at concentration of 0.001M and above inhibit turbidity loss, with a significant slowing of turbidity loss for the 0.0001M concentration of HDMeImBr.

HDMeImBr includes a longest carbon side chain length of C16 extending off of the charge center and comprises an imidizolium group. The imidizolium group of HDMeImBr is a soft acid charge center.

Illustrative Embodiments

A number of illustrative embodiments of the present additives, inks made from the additives, and applications incorporating such inks are discussed herein. The embodiments described are intended to provide illustrative examples of the present additives and uses and are not intended to limit the scope of the claimed subject matter.

One embodiment is directed to an electrostatically stabilized ink. The ink includes a dispersion which is electrostatically stabilized and comprises a pigment; and an additive comprising an ionic amphiphile having an opposite charge from the dispersion.

An additional embodiment provides an electrostatically stabilized ink. The ink comprises a dispersion which is electrostatically stabilized and comprises a pigment; and a cationic amphiphile.

An additional embodiment provides an electrostatically stabilized ink. The ink comprises a dispersion which is electrostatically stabilized and comprises a pigment; and a cationic amphiphile comprising a soft charge center.

An additional embodiment provides an electrostatically stabilized ink. The ink includes a dispersion which is electrostatically stabilized and comprises a pigment; and a cationic amphiphile comprising a longest carbon chain length of about C9 to C17.

An additional embodiment provides an electrostatically stabilized ink. The ink comprises an anionic dispersion which is electrostatically stabilized and comprises a pigment; and a cationic amphiphile that protects the dispersion against acid challenge. The cationic amphiphile has a concentration of no more than about 0.03 M in the ink.

An additional embodiment provides an electrostatically stabilized ink. The ink comprises an anionic dispersion which is electrostatically stabilized and comprises a pigment; and a cationic amphiphile that has sufficient hydrophobicity to interact with the dispersion.

An additional embodiment provides an electrostatically stabilized ink. The ink comprises an anionic dispersion which is electrostatically stabilized and comprises a pigment; and a cationic amphiphile that reduces a tendency of the pigment to bleed when deposited.

An additional embodiment provides an electrostatically stabilized ink. The ink comprises an anionic dispersion which is electrostatically stabilized and comprises a pigment and a dispersant; and a cationic amphiphile. The dispersant may be a polymer such as a polymer of acrylic acid.

An additional embodiment provides an electrostatically stabilized ink. The ink comprises an anionic dispersion which is electrostatically stabilized and comprises a pigment. The ink contains less than 0.005 wt. % of a buffer. The ink may contain less than about 0.001% of a buffer.

An additional embodiment provides a fluid supply. The fluid supply includes a reservoir. The reservoir contains an electrostatically stabilized ink such as the ones previously described.

An additional embodiment provides a fluid deposition system. The system includes a fluid-dispensing device configured to dispense fluid upon a medium; and a fluid supply. The fluid supply includes a reservoir having an interior in fluid communication with a fluid-dispensing device. The reservoir contains an electrostatically stabilized ink such as the ones previously described.

An additional embodiment provides a machine-printable item. The item comprises a medium capable of retaining ink deposited on the medium; and ink deposited on the medium in a form of an image. The ink comprises a pigment and an ionic amphiphile.

An additional embodiment provides a machine-printable item. The item comprises a medium capable of retaining ink deposited on the medium; and ink deposited on the medium in a form of an image. The ink comprises components or lacks components in a similar manner to the illustrative inks discussed above.

An additional embodiment provides a method for forming an electrostatically stabilized ink. The method comprises adding a dispersion to an ink and adding an ionic amphiphile to the ink. The resulting ink may take the form of one of the illustrative inks discussed above. The dispersion may be formed by adding a dispersant to a pigment particle.

An additional embodiment provides a method of using an electrostatically stabilized ink having a composition similar to those discussed above. The method comprises placing the ink in a fluid reservoir, and depositing the ink onto a medium. The medium may be capable of retaining at least a pigment of the ink. The medium may be a cellulose-based medium. The ink may be deposited on the medium in a manner such that it forms a desired image. For instance, the ink may be deposited by a printer in a pattern controlled by a control circuit of the printer.

The invention has been described with reference to various specific and illustrative embodiments and techniques. However, it should be understood that many variations and modifications may be made while remaining within the spirit and scope of the invention. For instance, while the exemplary embodiments are discussed with respect to ionic additives and dispersants, the scope of the claimed subject matter is not so limited unless stated otherwise in the claims. Thus, a soft acid may include, for instance, proton donor particles not having a positive charge.

What is claimed is:

1. An electrostatically stabilized ink, comprising:
   (a) a dispersion comprising a pigment, the dispersion being electrostatically stabilized and the dispersion comprising a first charge center having a charge; and
   (b) an additive comprising an ionic amphiphile comprising a second charge center with a charge opposite the charge of the first charge center, wherein the ionic amphiphile protects the dispersion against acid challenge without causing the dispersion to destabilize.

2. The ink of claim 1, wherein the second charge center is positively charged.

3. The ink of claim 2, wherein the ionic amphiphile has sufficient hydrophobicity to interact with the dispersion.

4. The ink of claim 2, wherein the second charge center is a soft charge center.

5. The ink of claim 4, wherein the ionic amphiphile comprises a longest carbon chain length of about C9 to C17.

6. The ink of claim 2, wherein the ionic amphiphile is a surfactant and reduces the tendency of the pigment to bleed.

7. The ink of claim 2, wherein the ionic amphiphile is able to protect the dispersant against substantial acid challenge of a pH of 3.0 at a concentration of no more than about $10^{-2}$ M for at least about one hour.

8. The ink of claim 2, further comprising a biocide.

9. The ink of claim 2, wherein the second charge center is selected from a group consisting of an imidizolium ion, a quaternary ammonium ion, a phosphonium ion, and a sulfonium ion.

10. The ink of claim 2, wherein the ionic amphiphile comprises a longest carbon chain length of about C12 to C16.

11. The ink of claim 2, wherein the ionic amphiphile does not comprise more than one carbon side chain having a longest carbon chain length greater than three carbon atoms.

12. The ink of claim 2, wherein the ionic amphiphile comprises a branched carbon chain.

13. The ink of claim 2, wherein the ionic amphiphile comprises a straight carbon chain comprising at least about 9 carbon atoms.

14. The ink of claim 2, wherein a longest carbon side chain of the ionic amphiphile is an alkane side chain.

15. The ink of claim 2, wherein the ionic amphiphile has a concentration of no more than about 0.01 M in the ink.

16. The ink of claim 1, wherein the dispersion comprises a pigment and a dispersant.

17. The ink of claim 16, wherein the dispersant comprises a polymer.

18. The ink of claim 1, wherein the ionic amphiphile has sufficient hydrophobicity to interact with the dispersion.

19. The ink of claim 1, wherein the ionic amphiphile comprises a soft charge center.

20. The ink of claim 19, wherein the ionic amphiphile comprises a longest carbon chain length of about C9 to C17.

21. The ink of claim 1, wherein the ink comprises surfactants that have an effect on a tendency of the pigment to bleed; the ionic amphiphile is a surfactant; and the surfactants present in the ink that have an effect on the tendency of the pigment to bleed consist essentially of the ionic amphiphile.

22. An electrostatically stabilized ink, comprising: a dispersion which is electrostatically stabilized and comprises a pigment; and a cationic amphiphile comprising a soft charge center, wherein the cationic amphiphile protects the dispersion against acid challenge without causing the dispersion to destabilize.

23. The ink of claim 22, wherein the soft charge center is selected from a group consisting of an imidizolium ion, a quaternary ammonium ion, a phosphonium ion, and a sulfonium ion.

24. The ink of claim 22, wherein the cationic amphiphile comprises a longest carbon chain length of about C9 to C17.

25. The ink of claim 22, wherein the cationic amphiphile is a surfactant and reduces a tendency of the pigment to bleed.

26. The ink of claim 22, wherein the dispersion comprises a pigment and a dispersant.

27. The ink of claim 26, wherein the dispersant comprises a polymer.

28. The ink of claim 22, further comprising a humectant.

29. The ink of claim 22, further comprising a biocide.

30. The ink of claim 22, wherein the cationic amphiphile comprises a longest carbon chain length of about C9 to C17.

31. The ink of claim 30, wherein the cationic amphiphile does not comprise more than one carbon side chain having more than C3.

32. The ink of claim 30, wherein the longest carbon side chain is an alkane side chain.

33. The ink of claim 30, wherein the longest carbon side chain is a straight side chain.

34. A machine-printable item, comprising:
(a) a medium capable of retaining ink deposited on the medium; and
(b) an electrostatically stabilized ink deposited on the medium in a form of an image; said electrostatically stabilized ink comprising:
(i) a dispersion comprising a pigment, the dispersion being electrostatically stabilized, and
(ii) a cationic amphiphile, wherein the cationic amphiphile protects the dispersion against acid challenge without causing the dispersion to destabilize.

35. The item of claim 34, wherein the cationic amphiphile comprises a soft charge center.

36. The item of claim 34, wherein the cationic amphiphile is a surfactant that reduces a tendency of the pigment to bleed.

37. The item of claim 34, wherein the medium is a cellulose-based medium.

* * * * *